United States Patent Office
2,945,058
Patented July 12, 1960

2,945,058

MANUFACTURE OF CROTONIC ACID

Richard M. Watson and Gaylord K. Finch, Kingsport, Tenn., assignors to Eastman Kodak Company, Rochester, N.Y., a corporation of New Jersey No Drawing. Filed Sept. 11, 1957, Ser. No. 683,213

7 Claims. (Cl. 260—530)

This invention concerns the manufacture of crotonic acid by the oxidation of crotonaldehyde with molecular oxygen.

It is known to manufacture organic acids from aldehydes by the oxidation of the aldehydes to the acids. Crotonaldehyde has been used as a starting material for such an oxidation in order to obtain crotonic acid. In this process diluents such as hydrocarbons, esters, ketones and organic acids have been used in the presence of a catalyst such as a cobalt, manganese and copper acetate at 25 to 30° C. as stated in U.S. Patent 2,413,235 with yields reported at 70 percent.

U.S. Patent 2,487,188 claims a process in which crotonic acid is obtained by oxidizing crotonaldehyde in the presence of manganese acetate and potassium permanganate in acetic acid at 5 to 10° C. with oxygen with yields reported at 78 percent. U.S. Patent 2,577,829 claims a liquid phase oxidation process in ligroin using a catalyst of tertiary butyl peroxide with yields reported at 62 to 72 percent.

However, due to oxidation to undesirable by-products, both low-boiling and high-boiling, maximum yields according to the prior art have been reported at 80 percent.

Catalysts have normally been employed in the air-oxidation of low-molecular weight aldehydes to catalyze the smooth decomposition of peroxy compounds and to prevent building up a dangerously high concentration of peroxy compounds. However, with our process we have obtained high yields other than those reported in the prior art and we have also reduced the formation of undesirable by-products to 0.5–4.0 percent.

One object of our invention is to provide a process for the molecular oxygen oxidation of crotonaldehyde to crotonic acid in high yields of from 85–96 percent. Another object is to provide a process for manufacturing crotonic acid which is efficent and economical to operate.

In the practice of our invention, wet crotonaldehyde which contains about 13 percent water is dissolved in a solvent such as heptane in a ratio of about one-quarter solvent to three-quarters crotonaldehyde. The mixture is fed into an autoclave in which an oxygen-containing gas is fed at a temperature of about 20° C. and at pressures of 50–100 pounds gauge. Air can be used as the oxygen-containing gas and is preferably introduced at such a rate that the composition of the gas circulating within the system will be approximately 8 percent oxygen. However, a range of 1–25 percent is satisfactory for operation.

The temperatures within the autoclave may range from 15 to 25° C. and the proportion of solvent to crotonaldehyde may be from 20–60 percent solvent to 40–80 percent crotonaldehyde. Other solvents other than heptane which may be used include such inert solvents as hexane, isopropyl acetate, toluene, ethyl acetate, acetone and acetic acid and the like. The particular inert solvent is not critical, but we prefer nonpolar solvents such as hydrocarbons.

The following data illustrates our reaction compared with that shown in the prior art.

Run A as follows was made with crotonaldehyde which had been dried by distillation and dissolved in benzene to form a 20 percent solution, after which air was passed through the solution for 14 hours in order to obtain crotonic acid. As can be seen from the table, the yield was 64 percent. Run B followed also the general method as in run A but used a much higher ratio of crotonaldehyde to solvent, and the solvent used was heptane instead of benzene. However, instead of improving the yield as would be expected, the yield was only 38 percent.

Run C was run according to our process using wet crotonaldehyde dissolved in heptane.

| Run | Percent $H_2O$ in Feed | ° C. Temp. | Time in Hours | Ratio of Crotonaldehyde to Solvent | Lbs. Acetic Acid per lb. Crotonic Acid | Lbs. Residue per lb. of Crotonic Acid | Percent Yield |
|---|---|---|---|---|---|---|---|
| A | 0.5 | 50 | 14 | 0.3 | 0.2 | 0.06 | 64 |
| B | 0.5 | 50 | 14 | 3.0 | 0.55 | 0.71 | 38 |
| C | 12.0 | 20 | 8 | 3.0 | 0.1 | 0.05 | 92 |

As illustrated above, it is clear that our process gives much higher yields with less formation of by-product acetic acid and residue than the prior art methods using dry crotonaldehyde and a catalyst. The following examples are intended to illustrate our invention but not to limit it in any way.

Example 1

Three volumes of crotonaldehyde containing 88 percent crotonaldehyde and 12 percent water, containing 520 grams of crotonaldehyde were dissolved in 140 grams of hexane and oxidized in a glass oxidation tower equipped with a circulation arm for 8 hours with air at 18° C. After 8 hours the conversion to crotonic acid was 23 percent. The oxidation product was then charged to a crotonaldehyde azeotrope recovery column at reduced pressure with sufficient water to obtain approximately a 50 percent crotonic acid mixture in the stripped base. Crotonic acid must be kept below 130° C. to prevent polymerization. Therefore, with the addition of sufficient water this recovery step of crotonaldehyde and solvent can be performed at atmospheric pressure.

The stripped base was then cooled to 0–5° C. where white crystals of crotonic acid were obtained, melting point 70–72° C., which represented approximately 80 percent of the crotonic acid. The filtrate was then extracted with an equal volume of a isopropyl acetate which is a suitable polar solvent. The extract was then distilled for recovery of isopropyl acetate and crotonic acid. The recovered isopropyl acetate contained the low-boiling by-products and the residue contained the high-boiling by-products.

It is understood, of course, that this process could be run continuously by recycling recovered crotonaldehyde, and isopropyl acetate. The low-boiling by-products which are mainly acetic acid can be removed by distillation.

A modified procedure which may be used consists of reduced pressure distillation (100 mm. of mercury) of the oxidation product without addition of water for the recovery of crotonaldehyde and solvent followed by subsequent reduced pressure distillation at 50 mm. of mercury for removal of by-product acetic acid and distillation of crotonic acid. Yield of crotonic acid having a melting point 70–72° C., 98–99 percent pure, based on the crotonaldehyde reacted was 91.5 percent. The conversion to low-boiling acetic acid was 3 percent and to high-boiling residues 0.9 percent.

*Example 2*

The same ratio and weights of crotonaldehyde to hexane was used as in Example 1 but the oxidation was carried out at 35° C. for 8 hours. Conversion and yield obtained was 34.4 percent and 82.5 percent respectively while conversion to acetic acid was 10.4 percent and to residue 2.2 percent. This run indicated the increase in by-products when oxidized at a higher temperature.

*Example 3*

A series of four runs was made using a 3/1 ratio of a 88 percent crotonaldehyde-water azeotrope to heptane (boiling point 95–100° C.) at 20° C. for 8 hours. The runs were distilled by reduced pressure distillation at 100 mm. of mercury, and the recovered crotonaldehyde and heptane recycled three times. The crotonic acid produced was distilled at a pressure of 50 mm. of mercury. An 87.2 percent yield was obtained with a 3.4 percent conversion to acetic acid and 6 percent conversion to residue.

The following table illustrates the results obtained using our process showing use of variations in the conditions within the range given above and also showing the use of various solvents.

| Solvent | Percent Solvent by Volume | Time in Hours | Oxidation Temperature | Percent Yield of Crotonic Acid | Percent Converted to Low Boilers (Acetic Acid) | Percent Converted to Residue |
|---|---|---|---|---|---|---|
| Hexane | 25 | 8 | 18 | 91.5 | 3 | 0.7 |
| Do | 25 | 8 | 18 | 93.5 | 3 | 0.7 |
| Do | 25 | 8 | 18 | 88.9 | | |
| Do | 25 | 8 | 18 | 91.0 | 3 | 0.7 |
| Do | 50 | 8 | 18 | 94.0 | 3 | 0.7 |
| Do | 50 | 8 | 18 | 95.0 | 5 | 0.4 |
| Do | 10 | 8 | 18 | 84.5 | 2.5 | 0.8 |
| Do | 20 | 8 | 18 | 84.9 | 3.0 | 0.9 |
| Do | 33 | 8 | 18 | 91.2 | 3.0 | 0.9 |
| Toluene | 25 | 8 | 18 | 96.5 | 2.8 | 0.6 |
| None | 0 | 8 | 18 | 64.0 | 2.3 | 0.5 |
| Acetic Acid | 25 | 8 | 18 | 85.8 | | 1.1 |
| Isopropyl Acetate | 25 | 8 | 18 | 91.3 | 3.7 | 0.3 |
| Ethyl Acetate | 25 | 8 | 18 | 88.0 | 2.6 | 0.5 |
| Heptane | 25 | 8 | 20 | 87.2 | 3.4 | 6.0 |
| Hexane | 25 | 8 | 35 | 82.5 | 10.4 | 2.2 |
| Do | 25 | 15 | 20 | 82.7 | 3.4 | 0.6 |

The above runs were carried out at atmospheric pressure indicating the higher yields obtained using our process even at atmospheric pressure. However, a faster rate is obtained when the pressure is increased and, therefore, we prefer to carry out our process under pressure within the range of 50–100 lbs. gauge. Recovery of the crotonic acid is carried out by distillation at reduced pressures in order to avoid temperatures of 130° C. or above. However, this phase of the process is not critical and may be carried out in various ways. Our process may be carried on either batchwise or continuously; the solvent-crotonaldehyde mixture is continuously fed to a tower, reactor or autoclave where it is contacted intimately with an oxygen-containing gas. The gas which is removed from the oxidizer is passed through a condenser where the material such as crotonaldehyde and crotonic acid are removed and the oxygen-containing gas recycled back to the oxidizer after being enriched with additional oxygen-containing gas.

We claim:

1. A process for the production of crotonic acid comprising the oxidation of crotonaldehyde in the absence of an added catalyst by incorporating a mixture of crotonaldehyde and water which contains 5–15% water in an inert solvent selected from the class consisting of hexane, heptane and toluene so that 20–60% of the resulting liquid by weight is the inert solvent, and contacting with an oxygen containing gas having 1–25% molecular oxygen at a temperature of 15–25° C.

2. A process for the manufacture of crotonic acid in the absence of an added catalyst comprising continuously feeding a mixture of crotonaldehyde containing 5–15% water and 20–60% based on the resulting mixture of an inert solvent selected from the class consisting of hexane, heptane, and toluene into a reactor with an oxygen containing gas having 1–25% molecular oxygen under a pressure of 50–100 lbs. gauge in intimate contact with the oxygen containing gas at a temperature of 15–25° C. continuously withdrawing a proportion of the reaction mixture and recovering the crotonic acid therefrom.

3. A continuous process for the production of crotonic acid in the absence of an added catalyst comprising mixing crotonaldehyde containing 5–15% by weight water and heptane to form a mixture containing about 33% heptane and intimately contacting with an oxygen containing gas containing 8% molecular oxygen at a pressure of 50–100 lbs. gauge at a temperature of about 20° C.

4. A process for the production of crotonic acid comprising the oxidation of crotonaldehyde in the absence of an added catalyst by incorporating a mixture of crotonaldehyde and water which contains 5–15% water in hexane so that 20–60% of the resulting mixture by weight is hexane and intimately contacting with an oxygen containing gas having 1–25% molecular oxygen at a temperature of 15–25° C.

5. A process for the production of crotonic acid comprising the oxidation of crotonaldehyde in the absence of an added catalyst by incorporating a mixture of crotonaldehyde and water which contains 5–15% water in heptane so that 20–60% of the resulting mixture by weight is heptane and intimately contacting with an oxygen containing gas having 1–25% molecular oxygen at a temperature of 15–25° C.

6. A process for the production of crotonic acid comprising the oxidation of crotonaldehyde in the absence of an added catalyst by incorporating a mixture of crotonaldehyde and water which contains 5–15% water in toluene so that 20–60% of the resulting mixture by weight is toluene and contacting with an oxygen containing gas having 1–25% molecular oxygen at a temperature of 15–25° C.

7. A process for the production of crotonic acid comprising the oxidation of crotonaldehyde in the absence of an added catalyst by incorporating a mixture of crotonaldehyde and water which contains 5–15% water in an inert solvent selected from the class consisting of hexane, heptane and toluene so that 20–50% of the resulting mixture by weight is the inert solvent and containing an oxygen containing gas having 1–25% molecular oxygen at a temperature of 15–25° C. for about 8 hours.

References Cited in the file of this patent

UNITED STATES PATENTS

| | | |
|---|---|---|
| 2,377,584 | Staudinger et al. | June 5, 1945 |
| 1,413,235 | Kennedy | Dec. 24, 1946 |